United States Patent [19]

Bock et al.

[11] Patent Number: 4,831,092

[45] Date of Patent: May 16, 1989

[54] MICELLAR PROCESS FOR PREPARING HYDROPHOBICALLY FUNCTIONALIZED CATIONIC POLYMERS (C-2114)

[75] Inventors: Jan Bock, Bridgewater; Paul L. Valint, Asbury, both of N.J.; Donald F. Jacques, Kingswood, Tex.

[73] Assignee: Exxon Research and Engineering Company, Florham Park, N.J.

[21] Appl. No.: 54,027

[22] Filed: May 26, 1987

Related U.S. Application Data

[63] Continuation of Ser. No. 904,461, Sep. 8, 1986, abandoned.

[51] Int. Cl.$^4$ ............... C08L 27/10; C08F 20/60; C08F 20/52; C08F 20/58
[52] U.S. Cl. ................... 526/209; 526/217; 526/258; 526/287; 526/292.95; 526/307.2; 526/310; 526/307; 526/304; 526/295
[58] Field of Search ............ 526/307.2, 310, 209, 526/304, 307, 217, 258, 287, 292.95, 295

[56] References Cited

U.S. PATENT DOCUMENTS

| | | | |
|---|---|---|---|
| 3,147,218 | 9/1964 | Booth et al. | 526/229 |
| 4,432,881 | 2/1984 | Evani | 524/423 |
| 4,452,957 | 6/1984 | Neigel | 526/310 |
| 4,520,182 | 5/1985 | Turner et al. | 526/307.2 |
| 4,533,708 | 8/1985 | Costello | 526/295 |

*Primary Examiner*—Joseph L. Schofer
*Assistant Examiner*—Peter F. Kulkosky
*Attorney, Agent, or Firm*—Richard E. Nanfeldt

[57] ABSTRACT

This invention provides a process for preparing novel hydrophobically associating terpolymers containing cationic functionality which are useful for clean-up of waste waters containing organic contaminants. These water soluble polymers contain both water soluble and water insoluble monomers. The water soluble monomers are acrylamide (AM) and a salt of an unsaturated amine base (C) and the water insoluble monomer is a higher alkyl(meth)acrylamide or alkyl(meth)acrylate (R). These polymers are referred to as CRAM. The process for their preparation relies on solubilizing the water insoluble monomer into an aqueous micellar solution containing one or more surfactants and the water soluble monomers. The surfactants are specifically selected to enable homogeneous dispersion of the hydrophobic monomer(s) in the presence of cationic monomers, such as 3-methacrylamidopropyltrimethylammonium chloride (MAPTAC), 2-methylacrylatoethyltrimethylammonium chloride (METAC), or diallyl dimethylammonium chloride (DMDAAC). Redox or free radical initiators are used to copolymerize both the water soluble and water insoluble monomers forming terpolymers of ethylenically unsaturated amine base salts, alkyl(meth)acrylamides or alkyl(meth)acrylates and acrylamide. These polymers provide exceptional clean-up of waste waters containing organic contaminants. Also, they are very effective for resolving oil-in-water emulsions, such as those found in oil production.

10 Claims, No Drawings

MICELLAR PROCESS FOR PREPARING HYDROPHOBICALLY FUNCTIONALIZED CATIONIC POLYMERS (C-2114)

This is a continuation of application Ser. No. 904,461, filed 9/8/86, now abandoned.

BACKGROUND OF THE INVENTION

1. Field of the Invention

This invention provides a process for preparing novel hydrophobically associating terpolymers containing cationic functionality which are useful for clean-up of waste waters containing organic contaminants. These water soluble polymers contain both water soluble and water insoluble monomers. The water soluble monomers are acrylamide (AM) and a salt of an unsaturated amine base (C) and the water insoluble monomer is higher alkyl(meth)acrylamide or alkyl(meth)acrylate (R). These polymers will hereafter be referred to as CRAM. The process for their preparation relies on solubilizing the water insoluble monomer into an aqueous micellar solution containing one or more surfactants and the water soluble monomers. The surfactants are specifically selected to enable homgeneous dispersion of the hydrophobic monomer(s) in the presence of cationic monomers, such as 3-methacrylamidopropyltrimethylammonium chloride (MAPTAC), 2-methacrylatoethyltrimethylammonium chloride (METAC) or diallyl dimethylammonium chloride (DMDAAC). Redox or free radical initiators are used to copolymerize both the water soluble and water insoluble monomers, forming terpolymers of ethylenically unsaturated amine base salts, alkyl(meth)acrylamides or alkyl(meth)acrylates and acrylamide. These polymers provide exceptional clean-up of waste waters containing organic contaminants. Also, they are very effective for resolving oil-in-water emulsions, such as those found in oil production.

2. Description of Prior Art

The production of waste water clean enough for safe disposal continues to be a problem, especially when oil is emulsified in the primary waste water. In oil production, especially where high levels of water flooding or steam flooding are being practiced, oil-in-water emulsions are generated. Other oil-in-water emulsions of concern in the waste water treating area are those produced as a result of steel mill and metal working operations, food processing, refinery and chemical plant operation, cooling water blowdown, bitumen extraction from tar sands and shale oil operations, rain water run-off, and a host of others. These emulsions all have in common the fact that the oil or organic phase is insoluble in the water continuous phase. The amount of oil dispersed in these water continuous emulsions varies from a few to several hundred parts per million in waste waters to several percent (5% to 25% or more) in fluids right out of the wellhead.

The oil is generally well dispersed in the water phase as very small droplets that are stabilized as a result of the presence of natural surfactants. The stability of these oil-in-water emulsions generally results from either a negative charge imparted to the droplets by these surfactants or from steric stabilization caused by surfactants or by the shear which the fluid experiences during production, which causes the generation of smaller and more stable droplets, or from several other sources.

Various chemicals, surfactants and polymers are generally applied to these waters to enhance the separation of oil and water. These chemicals are used to aid in foam generation in flotation. In addition they may be used to cause oil droplet surface charge neutralization, which results in destabilization of the oil-in-water emulsion. This destabilization results in agglomeration of the oil droplets, floc formation and possibly several other beneficial effects. While the use of such chemicals generally enhances the separation of oil from oil-in-water emulsions, there remains significant room for improvement. The type of water soluble polymers currently used are generally acrylamide copolymers or melamine/formaldehyde polymers or others. For example, Bolhofner, in U.S. Pat. No. 4,472,284, describes the treatment of water containing fats, oils and greases using a malamine-formaldehyde condensation product, alone or in combination with polyacrylamide. Rather high polymer concentrations are needed and a two polymer system can present handling difficulties during field operations.

Another approach to the treatment of waste water involves the use of water insoluble polymeric adsorbents, as described by Renner in U.S. Pat. No. 3,716,483 or Takegani, et la. in U.S. Pat. No. 4,081,403. These processes for treating waste water are costly and cannot achieve the degree of clean-up of the present invention.

Another approach involves the use of copolymers of acrylamide with various cationic monomers of various comonomer ratios. Some of the cationic monomers that have been used are: methylacrylamidoalkyltrimethylammonium salts, such as methacrylamidopropyltrimethylammonium chloride (MAPTAC), as described in U.S. Pat. No. 4,160,742, or similar acrylate esters; diallyl dialkyl ammonium salts, as described by Booth, et al. in U.S. Pat. No. 3,147,218 and in U.S. Pat. No. 3,316,181; salts of dimethylaminoethylmethacrylate and the like. Buris, et al., U.S. Pat. No. 4,224,150, describe a process for clarifying aqueous systems emplying quaternary ammonium adducts of polymerizable tertiary ammonium salts and acrylamide. These polymers are generally available as high molecular weight materials, either in aqueous solution, as emulsions of various types, or in solid form, which requires dissolution before use.

The use of hydrophobic groups on water soluble polymers to enhance the rheological properties of water based fluids has been described. One approach to provide polyacrylamide based systems containing hydrophobic groups is described by Bock, et al., U.S. Pat. No. 4,520,182. Water soluble acrylamide copolymers containing a small amount of oil soluble or hydrophobic alkylacrylamide groups were found to impart efficient viscosification to aqueous fluids. Landol, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified non-ionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentration. Emmons, et al., U.S. Pat. No. 4,395,524, teaches acrylamide copolymers as thickeners for aqueous systems. While these polymers possess hydrophobic groups they are prepared using alcohol containing solvents which are known chain transfer agents. The resulting polymers have rather low molecular weights and, thus, relatively high polymer concentrations are required to achieve reasonable viscosification of water based fluids. While these polymers containing hydrophobic groups are disclosed as providing aqueous thickening properties, their use for oily water clean-up or to break oil-in-water emulsions is not taught. Furthermore, the combination of hydrophobic groups and cationic groups in a water soluble polymer is not taught, nor the use ofthis combination for oily water treatment.

One of the objects of this invention is to overcome the deficiencies in the use of the water soluble polymers of the prior art for treating oily waste water and resolvign oil-in-water emulsions. A new class of water soluble polymer, described in copending application Attorney Docket No. C-1975, can be used at a lower treat rate and, hence, is more efficient than prior art materials for oily water treatment. Furthermore, these novel terpolymers provide a superior degree of clean-up or oil removal in comparison to prior art materials. These new polymers contain an nonionic water soluble monomer, such as acrylamide, a cationically charged water soluble ethylenically unsaturated amine based monomer, such as methacrylamidopropyltrimethylammonium chloride (MAPTAC), and a water insoluble or hydrophobic monomer, such as an alkyl(meth)acrylamide or alkyl(meth)acrylate with a chain length of six carbons or greater.

When these polymers are placed in an aqueous solvent, the hydrophobic groups aggregate or associate in a manner similar to a surfactant. This hydrophobic association between polymer chains in solution results in an increase in the hydrodynamic size of the molecule, which, in turn, causes an increase in viscosity. In addition, if oil droplets are present there is an attractive interaction between the hydrophobic groups and the hydrophobic oil droplets. We have found that the presence of cationic groups, such as methacrylamidopropyltrimethylammonium chloride (MAPTAC) causes an expansion of the polymer in solution, an improvement in polymer solubility and a favorable interaction with the hydrophobic groups. Thus, polymers containing both cationic amine based groups and hydrophobic groups provide a significant improvement in viscosification efficiency of water based systems. The synergism between the cationic and hydrophobic groups in terms of oily water treatment or breaking of oil-in-water emulsions also sets these polymers apart from those of the prior art.

Synthesis of polymers containing both hydrophobic and cationic functionality presents difficulties. In order for polymerization to be effected the monomers must obviously come into close proximity to one another. The incompatibility of the oil soluble and water soluble monomers prevents an effective concentration of one or the other of these monomeric species from being achieved at the locus of polymerization of the other comonomer. Several processes described in the prior art could conceivably achieve this but have serious deficiencies, necessitating this invention. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids, nor be very effective in treating oily water.

Techniques for polymerizing water soluble polymers, such as those taught in U.S. Pat. Nos. 4,154,190, 3,211,708, 3,002,960 and 3,284,393, cannot be used to prepare the compositions of this invention. Also, techniques or processes for preparing cationic polymers or copolymers containing cationic monomers, such as in U.S. Pat. Nos. 4,452,957, 4,283,517, 4,160,742 and 3,316,181, have deficiencies in terms of incorporating the hydrophobic monomers needed for the polymers of this invention. This art does not teach the formation of a sufficiently fine dispersion of the water and oil soluble monomers to enable uniform reaction and homogeneous terpolymers to be produced. The use of mutual solvents or solvent mixtures to dissolve the water and oil soluble monomers as taught by Lenke, et al., U.S. Pat. No. 4,151,333, and Barua, et al., U.S. Pat. No. 4,098,987, has some serious limitations. Although this approach undoubtedly allows the incompatible monomers to come into close proximity to one another, since the dispersion is on a molecular scale often the resulting copolymer is insoluble in the same solvent as shown in U.S. Pat. No. 4,151,333. This leads to precipitation of the copolymer before it has achieved sufficient molecular weight required in many applications, such as aqueous viscosification or oily water treatment. The use of water miscible solvents, such as alcohols, ether and acetone, either alone or with water, as taught in U.S. Pat. No. 4,098,987, results in extremely low molecular weight (e.g., 10,000) polymers due to the high chain transfer characteristics of these solvents. Thus, these teachings provide polymers whihc are rather ineffective viscosifiers for aqueous fluids and do not provide the extent or efficiency of oily water clean-up or breaking of oil-in-water emulsions. A major objective of this invention is to teach a process for preparing water dispersible or water soluble polymers containing both hydrophobic and cationic functionality. A further objective is to provide a process for producing these polymers with high molecular weight.

Two techniques have been found most useful for preparing hydrophobically associating copolymers of acrylamide and alkylacrylamides. The first method was based on the use of a water continuous microemulsion to disperse the oil soluble monomer in a solution of the water soluble monomers. Details of the procedures and techniques are taught by Turner, et al., U.S. Pat. No. 4,521,580. A second method for preparing copolymers of acrylamide and alkylacrylamide was based on dispersing the oil soluble monomers using an aqueous micellar solution of the water soluble monomers. Suitable surfactants and the details of the polymerization are taught by Turner, et al. in U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactant used in the polymerization. In particular, strong ionic interactions or complexes can be formed between cationic water soluble monomers, such as ethylenically unsaturated amine based monomers, and anionic surfactants, such as alkyl sulfates and sulfonates taught in U.S. Pat. No. 4,528,348. Thus, a process is described in this application which overcomes these interactions to allow for the preparation of novel hydrophobically associating cationic terpolymers. The compositions of the terpolymers are more fully described in copending application Attorney Docket No. C-1975.

SUMMARY OF THE INVENTION

A process is described for producing unique and novel cation-containing terpolymers of water soluble monomers with water insoluble monomers which are useful for clean-up of waste waters containing organic contaminants. The process relies on the complete solubilization of the water insoluble monomer by means of a dilute solution of a suitable water soluble surfactant. The type and concentration of surfactant are chosen to produce a clear, uniform, homogeneous aqueous dispersion of the hydrophobic monomers in the presence of both nonionic and cationic water soluble monomers and, in addition, the reaction medium remains a clear, uniform, homogeneous mixture with no phase separation as the reaction proceeds to completion. The micelles formed by the surfactant are small aggregates, consisting of on the order of 50 to 200 molecules. They are stable toward phase separation and effectively disperse the water insoluble monomer on a very fine scale so that the terpolymerization is effected without the formation of latexes or fine particulates of water insoluble polymer.

DETAILED DESCRIPTION OF THE INVENTION

The micellar free radical polymerization process of this invention comprises the steps of forming a micellar surfactant solution of a specially chosen surfactant and the oil soluble or hydrophobic monomer in an aqueous solution of acrylamide and cationic monomer, deaerating this solution by purging with an inert gas such as nitrogen or additionally applying a vacuum; raising the temperature to the desired reaction temperature; adding sufficient free radical initiator to the reacton solutoin; and polymerizing for a sufficient period of time at a sufficient temperature to effect polymerization. The resulting terpolymer of acrylamide, cationic monomer and a hydrophobic monomer can be isolated from the reaction mixture by any of a variety of techniques which are well known to one skilled in the art. For example, the polymer may be recovered by precipitation using a nonsolvent, such as acetone, methanol, isopropanol or mixtures thereof. The precipitated polymer can then be washed and oven dried to provide a product in the form of a free flowing powder. Alternatively, the polymer solution may be used as is diluting with the desired aqueous solvent to the concentration of use.

The present invention describes the terpolymerization of a nonionic, water soluble, ethylenically unsaturated monomer, such as acrylamide; a water soluble, cationic monomer from the group consisting of salts of ammoniumalkyl(meth)acrylamides, ammoniumalkyl(meth)acrylates or diallyl dialkyl ammonium salts; and a water insoluble monomer, such as an N-alkyl(meth)acrylamide or alkyl(meth)acrylate. The process for synthesizing these terpolymers relies on solubilizing the water insoluble monomer into a predominantly aqueous media by the use of a suitable water soluble surfactant, such as dodecyltrimethylammonium chloride. When mixed with an aqueous solution of the water soluble acrylamide monomer and the water soluble cationic monomer, the surfactant solution can disperse the water insoluble monomer on an extremely fine scale so that the reaction mixture is isotropic, clear and homogeneous. These micellar reaction mixtures are free from visible oil droplets or particulates of the water insoluble monomer. The terpolymerization can, therefore, be initiated by water soluble initiators to yield terpolymers which are substantially freee of visible particulates. The resultant reaction mixture remains homogeneous throughout the course of the reaction without the need for agitation with external mixers or stirrers.

Micelles formed by the surfactant which solubilize the water insoluble monomer are generally small aggregates which consist of on the order of 50 to 200 molecules. They may assume a variety of shapes, from spherical to rod-like or cylindrical, and generally are in the size range from about 20 Angstroms to 500 Angstroms in diameter. These micelles form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Angstroms. They, therefore, tend to phase separate upon standing, leading to undesirable inhomogeneities in the produced polymer. The homogeneous micellar reaction mixtures is, on the other hand, much more stable against demixing than the formulations used in emulsion polymerization processes. Indeed, no stirring is required during the course of the micellar polymerization; the micellar aggregates remain extremely finely dispersed throughout the reaction. Moreover, the finely dispersed nature of the micellar aggregates permit the polymerization to occur in such a way that a water soluble polymer is produced which does not contain particulates or latexes of water insoluble polymers. Thus, more of the polymer is available for solution rheology control or for treating oily waste water.

The surfactants used in this process may be one of the cationic surfactants, such as alkyltrimethylammonium halides, either chlorides or bromides. Preferred are decyltrimethylammonium chloride, dodecyltrimethylammonium chloride and tetradecyltrimethylammonium chloride. For these ionic surfactants the Krafft point, which is defined as the minimum temperature for micelle formation, must be below the temperature used for the polymerization. Thus, at the conditions of polymerization, the desired surfactant will form micelles which solubilize the water insoluble monomer. To determine if a particular cationic surfactant can be used in the process of the instant invention, it must solubilize the hydrophobic monomer at a level of at least about 10% of its weight. The surfactant must also form a clear, homogeneous solution in the presence of the water soluble monomers at the polymerization temperature.

Nonionic surfactants can also be used for preparing the polymers of this invention. For example, ethoxylated alcohols, ethoxylated alkyl phenols, ethoxylated dialkyl phenols, ethylene oxide-propylene oxide copolymers and polyoxyethylene alkyl ethers and esters can be used. Preferred nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule. Combinations of cationic and nonionic surfactants can also be used as long as the surfactants solubilize the hydrophobic monomer into an aqueous phase containing the water soluble monomers. The surfactant or mixture of surfactants will be used at concentrations above their critical micelle concentration and preferably at concentration such that only one hydrophobic monomer is associated with each surfactant micelle. Thus, the actual concentration of surfactant for a given polymerization will depend on the concentration of insoluble or hydrophobic monomers employed.

Polymerization of the water soluble and water insoluble monomers is conducted in an aqueous micellar solution containing a suitable free radical initiator. Examples of suitable water soluble free radical initiators include peroxides, such as hydrogen peroxide; persulfates, such as sodium, potassium or ammonium persulfate and water soluble azo initiators. The concentration of the free radical initiator is about 0.01 to about 0.5 grams per hundred grams of total monomers. Suitable oil soluble initiators are organic peroxides and azo compounds, such as azobisisobutyronitrile. Water soluble initiators are preferred, such as potassium persulfate. Redox initiation involving an oxidant, such as potassium persulfate or bromate, and a reductant, such as sodium metabisulfite or tertiary amines, such as triethyl amine, can also be used to initiate polymerization, particularly at low temperatures.

Polymerization at lower temperature results in the formation of higher molecular weight polymers, which are desirable from the standpoint of efficient aqueous viscosification and oily water clean-up. Typically it is desired to employ from about 0.01 to 0.5 weight percent of initiator based on the weight of monomers. The polymerization temperature is preferably about 0° C. to about 90° C., more preferably about 20° C. to about 80° C. and most preferably about 25° C. to about 70° C.

The water soluble hydrophobically associating terpolymers which can be prepared by the process of the instant invention are characterized by the formula:

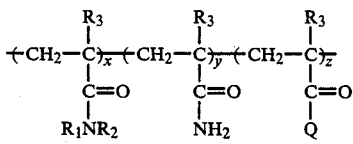

wherein $R_1$ is preferably a $C_4$ to $C_{22}$ linear or branched alkyl, alkylcycloalkyl, or alkylaryl group, more preferably $C_6$ to $C_{22}$, and most preferably $C_6$ to $C_{18}$; $R_2$ is the same or different group as $R_1$, or hydrogen or $C_1$ to $C_3$ linear or branched alkyl group; $R_3$ is hydrogen or methyl; and Q is a salt of an ammonium cation, such as $NH(CH_2)_n N^+(R_{4,5,6})_3 X^-$ or $O(CH_2)_n N^+(R_{4,5,6})_3 X^-$ wherein $n=1$ to 6 and $R_4$, $R_5$ and $R_6$ can be hydrogen, a $C_1$ to $C_6$ linear or branched group, or a $C_5$ to $C_8$ cycloalkyl, aromatic, or alkylaromatic group; and $X^-$ is an anion, such as chloride, bromide or methyl or hydrogen sulfate. Typical, but non-limiting ranges of composition of the terpolymer are represented preferably by x equal to 0.1 to 20 mole percent, more preferably 0.2 to 10 mole percent and most preferably 0.2 to 5 mole percent. The mole percentage of acrylamide, y, is preferably 0 to 94.9, more preferably 10 to 94.8 and most preferably 25 to 94.8. The mole percentage of the cationic monomer, z, is preferably 5 to 99.9, more preferably 5 to 80, most preferably 5 to 70.

The process of the present invention can also provide terpolymers exemplified by the following formula:

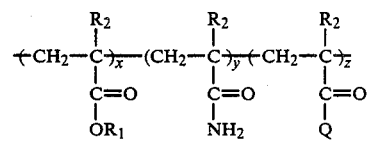

wherein $R_1$ is preferably a $C_4$ to $C_{30}$ linear or branched alkyl, alkylcycloalkyl, or alkylaryl group, more preferably $C_6$ to $C_{22}$, and most preferably $C_6$ to $C_{18}$; $R_2$ is hydrogen or methyl; and Q is a salt of an ammonium cation, such as $NH(CH_2)_n N^+(R_{3,4,5})_3 X^-$ or $O(CH_2)_n N^+(R_{3,4,5})_3 X^-$ wherein $n=1$ to 6, and $R_3$, $R_4$ and $R_5$ can be hydrogen, a $C_1$ to $C_6$ linear or branched alkyl group, or a $C_5$ to $C_8$ cycloalkyl, aromatic, or alkylaromatic group and $X^-$ is an anion, such as chloride, bromide, or methyl sulfate. Typical but non-limiting ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

The process of the present invention can also provide polymers exemplified by the following formula:

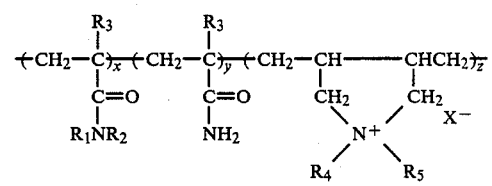

wherein $R_1$ is preferably a $C_4$ to $C_{30}$ linear or branched alkyl, alkylcycloalkyl, or alkylaryl group, more preferably $C_6$ to $C_{22}$, and most preferably $C_6$ to $C_{18}$; $R_2$ is the same or differnt group as $R_1$, or hydrogen, or $C_1$ to $C_3$ linear or branched alkyl group; $R_3$ is hydrogen or methyl; $R_4$ and $R_5$ can be hydrogen, a $C_1$ to $C_6$ linear or branched alkyl group, or a $C_5$ to $C_8$ cycloalkyl, aromatic, or alkylaromatic group; and $X^-$ is an anion, such as chloride, bromide, or methyl sulfate. Typical but non-limiting ranges of composition of the terpolymer are represented preferably by x equal to 0.1 to 20 mole percent, more preferably 0.2 to 10mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

The process of the instant invention can also provide polymers exemplified by the following formula:

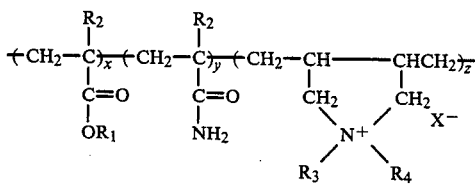

wherein $R_1$ is preferably a $C_4$ to $C_{30}$ linear or branched alkyl, alkylcycloalkyl group or alkylaryl, more preferably $C_6$ to $C_{22}$, and most preferably $C_6$ to $C_{18}$; $R_2$ is hydrogen or methyl; $R_3$ and $R_4$ can be hydrogen, a $C_1$ to $C_6$ linear or branched group, or a $C_5$ to $C_8$ cycloalkyl, aromatic, or alkylaromatic group; and $X^-$ is an anion, such as chloride, bromide or methyl sulfate. Typical but non-limiting ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

Molecular weight of the polymer is also an important parameter which can be controlled by the polymerization process conditions of this invention. High molecular weight polymers incorporating both cationically charged ammonium groups and hydrophobic groups can be prepared by using high monomer concentrations under conditions which provide low effective radical concentration. For example, reducing the reaction temperature or the concentration of the initiator will, in general, reduce the radical concentration and result in higher polymer molecular weights. Increased molecular weight will improve solution rheological properties and oily water treatment performance. All other things being equal, the higher the molecular weight the less soluble the polymer. Thus, as molecular weight is increased the amount of hydrophobic groups should be reduced and the amount of cationic groups increased.

To evaluate and characterize the unique and useful properties of hydrophobically associating polymers and the effect of the process conditions of this invention, dilute solution viscometric measurements were made. These measurements are particularly useful for evaluating the effect of composition and polymerization process conditions on the hydrodynamic size of the polymer in solution and the influence of associating groups. The hydrodynamic size is measured by the intrinsic viscosity which is proportional to the viscosity average polymer molecular weight. To determine the intrinsic viscosity, the reduced viscosity is first evaluated at several polymer concentrations in the dilute regime. The reduced viscosity is defined as the incremental viscosity increase of the polymer solution relative to the pure solvent normalized with respect to the pure solvent viscosity and the polymer concentration. A plot of reduced viscosity versus polymer concentration should yield a straight line at low polymer concentrations. The intercept of this reduced viscosity plot at zero polymer concentration is defined as the intrinsic viscosity, while the slope is the Huggins' interaction coefficient times the square of the intrinsic viscosity. The Huggins' constant is a measure of polymer-solvent interactions. For hydrophobically associating polymers, it is characteristically greater than the 0.3 to 0.7 value normally observed for non-associating polymers, such as polyacrylamides.

Measurement of the dilute solution viscosity can be mde with conventional Couette or capillary viscometers. A set of Ubbelhode capillary viscometers were used in this study and shear rate effects were found to be negligible in the concentration range of interest. However, since the terpolymers contain cationically charged groups, a polyelectrolyte effect was observed in dilute solution. This polyelectrolyte effect resulted in an increase in reduced viscosity with decreasing polymer concentration and tended to mask the effect of hydrophobic associations. The addition of salts, such as sodium chloride or sodium sulphate, shielded the charge repulsion causing the polyelectrolyte effect and resulted in the desired linear reduced viscosity-concentration profile. The dilute solution measurements were thus made on solutions containing 2.0 weight percent sodium chloride.

The soluton viscosity of associating polymers in the semi-dilute concentration regime is dramatically different than conventional water soluble polymers. Viscosities of these solutions were measured by means of a Contraves low shear viscometer, model LS-30, using a No. 1 cup and No. 1 bob. Temperatures were controlled to $\pm 0.1°$ C. and measurements were made at a variety of rotational speeds corresponding to shear rate ranging from about $1.0 \, \text{sec}^{-1}$ to about $100 \, \text{sec}^{-1}$. In contrast to conventional water soluble polymers and relatively low molecular weight, weakly associating polymers, the terpolymers prepared by the process of this invention can exhibit significant relaxation times, which result in slow equilibration. To determine steady state viscosity values at a given stress or shear rate, relatively long measurement times were employed. This effect is most evident at higher polymer concentrations, higher polymer molecular weights and in regions of strong intermolecular hydrophobic associations.

Another advantage of the polymers disclosed here over polymers currently used is the discovery that the presence of a hydrophobic group on the water soluble polymer results in a significant improvement in the breaking of reverse emulsions and the removal of emulsified or dispersed oil from waste waters. By way of example, oil droplets emulsified in water generally carry a negative surface charge or zeta potential which helps to stabilize the emulsion, keeping the droplets dispersed and making them difficult to resolve or break. Cationic polymers or surfactants are used to neutralize the surface charge. Once the charge is neutral the droplets may begin to approach each other and agglomerate or coalesce since the electrostatic repulsion responsible for a significant portion of the emulsion's stability has been eliminated. Eventually large floc formation or liquid oil formation occurs. Once the droplets begin to flocculate they can begin to float since they are much larger than the starting oil droplets. As they grown in size they will rise to the surface of the water at a faster range. If a high molecular weight cationic polymer is used for charge neutralization, the polymer will accelerate the separation of the oil since the polymer is attracted to the oil droplet by coulombic attraction, hydrogen bonding or other mechanisms. In some cases low molecular weight cationic chemicals are added for charge control and then high molecular weight nonionic or anionic polymers are added to cause polymer bridging between droplets and accelerate floc formation.

The advantage of the disclosed polymer is related to the fact that they are water soluble or dispersible, but also contain small amounts of hydrophobic groups. Not wishing to be bound by theory, we believe that while conventional polymers can only attach themselves to oil droplets by coulombic attraction, hydrogen bonding or other mechanisms, the hydrophobic groups of these novel terpolymers can also be attracted by a hydrophobic group—hydrophobic oil droplet association. While coulombic attraction still appears to be the strongest type of attraction the hydrophobic association or hydrophobic effect appears to add a significant strengthening to this attraction as evidenced by improved emulsion breaking and waste water clean-up. Indications are that the cationic hydrophobic polymers prepared by the process of this invention enable the formation of very strong floc particles. This is based on the observation that, unlike many conventional treatments, the floc particles produced by using the polymers prepared by the process of this invention are very difficult to redisperse. Adsorption on the hydrophobic functionalized water soluble polymer on the surface of the oil droplets is believed to be the cause of this observation.

To evaluate the influence of polymerization process conditions on the use of these polymers for the removal of emulsified oil from water, about 0.1 to about 200 ppm of the hydrophobically functionalized water soluble cationic polymer were added. After contacting under suitable agitation conditions for a prescribed time period, the emulsified oil droplets and polymer separated under quiescent conditions into a distinct layer from the water. The rate of mixing after polymer addition varied, depending on the type of water being treated, the amount of oil emulsified in the water, temperature and several other conditions The concentration of oil remaining in the water after treatment with the disclosed polymers was significantly less than the concentration of oil remaining in the water after similar treatment with a similar polymer not containing the novel hydrophobe functionalization. The oil which separated as a distinct layer from the layer of water was separated from the water by conventional methods.

While it is difficult to exactly simulate a process to break oil water emulsions and oil field produced fluids, commonly referred to as reverse emulsions, it is common practice to make laboratory emulsions using crude oil from an oil production field of interest by high shear mixing the given crude into water using a Waring blender or homogenizer. The formed oil-in-water emulsion can then be diluted with water and other suitable materials to simulate the oil production field being studied. The emulsions thus produced simulate oily waste waters from a given area, but are recognized as being an approximation. One would typically use these laboratory emulsions for testing chemical additives in the laboratory prior to confirmatory testing on the actual system in the field.

A common laboratory test used to simulate a mild water clarification process in the field is what is referred to as the Jar Test. The Jar Test involves putting 500 ml of a laboratory prepared or actual field emulsion into 600 ml clear glass beakers (six at a time). Larger beakers may be used if enough fluid is available. The beakers are then placed on a six-paddle Phipps & Bird stirrer and mixed at a high rate, referred to as the fast mix period. Polymer is added at this mixing speed and timing is begun. After a specified amount of time at high speed the mixing rate is reduced to a much slower rate for another specified amount of time. The beakers are removed from the mixer and allowed to stand for another period of time. Samples of solution are removed from a point near the 250 ml mark on the beakers and tested for turbidity (NTU) using standard test equipment and oil-in-water content using one of several available methods. An example of one of the oil-in-water determinations is to Freon-extract the oil from waste water and then measure its infrared absorbance relative to a standard. The object of the test is to achieve the lowest NTU or oil level using the smallest amount of polymer. The actual mixing rates and times used in the Jar test depend on the system being simulated and vary from study to study. The Jar Test, from the experience of many investigators over the years, has been shown to provide a good simulation of field clarification systems.

Another laboratory test commonly used in the current art is the Wemco 1+1 Laboratory Flotation Machine, available from Wemco in Sacramento, Calif. The technique used by the Wemco is also commonly referred to as induced air flotation. The Wemco 1+1 Laboratory Flotation Machine is a small scale pilot unit designed to model the full scale units built by Wemco, which are commonly used in oil fields and in several other industries for water clarification and oil and solids removal. The laboratory Wemco, from the experience of several investigators over the years, has been found to provide a good simulation of what will occur in the larger unit when it is used in the evaluation of chemical additives. Laboratory prepared or actual field waste waters or emulsions are added to the test bowl of the Wemco and mixed for a few seconds with chemical additives without aeration. The air is then turned on and flotation occurs. Samples of the Wemco treated water are then withdrawn from a point near the bottom of the bowl for turbidity and oil-in-water determinations as described above.

DESCRIPTION OF THE PREFERRED EMBODIMENTS

The following Examples illustrate the present invention without, however, limiting the same hereto.

COMPARATIVE EXAMPLE 1

A micellar solution of 3.0 weight percent sodium dodecylsulfate, SDS, was prepared in 500 ml of deoxygenated water. N-1-octylacrylamide, 0.403 gm, was dissolved with 12.37 gm of acrylamide and 9.73 gm of MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of 0.0117 gm of $K_2S_2O_8$ and 0.0077 gm of $Na_2S_2O_5$. Within a short time a white solid was observed to precipitate and this continued for several hours. The resulting polymer was isolated by filtration and found to be partially insoluble in water, yielding a heterogeneous suspension rather than the desired soluble terpolymers of this invention.

COMPARATIVE EXAMPLE 2

N-1-octylacrylamide, 0.40 gm, were added to a homogeneous solution of 12.4 gm of acrylamide and 9.7 gm of MAPTAC in 500 ml of deoxygenated water. The N-1-octylamide did not dissolve and remained as a suspension. This dispersion was transferred to a 1 L Morton style resin kettle fitted as described in Comparative Example 1 and a similar initiation procedure was employed. At the end of polymerization small insoluble latex particles were observed in the reaction. Following polymer isolation, using the procedure described in Example 1, the resulting polymer was found to be only partially soluble in water. This heterogeneous suspension contained microlatexes of insoluble particles rather than the desired soluble terpolymers of this invention.

COMPARATIVE EXAMPLE 3

An aqueous methanol solution was prepared with purified, deoxygenated water. N-1-octylacrylamide, 0.43 gm, was dissolved in 500 ml of this solution, followign by 12.37 gm of acrylamide, and 9.84 gm of 3-methacrylamidopropyltrimethylammonium chloride. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of 0.00117 gm of $K_2S_2O_8$, followed by 0.00077 gm $Na_2S_2O_5$. After stirring for 16 hours at 25° C. the viscous solution was poured slowly into 3 L of acetone. The precipitated polymer was then masticated in a Waring blender with additional acetone, filtered and dried under vacuum at 30° C. The resulting polymer was determined to have low molecular weigh relative to the polymers of this invention, based on solution viscosity measurements.

EXAMPLES 1-24

Micellar Polymerization of N-1-Octylacrylamide, MAPTAC and Acrylamide

A micellar surfactant solution was prepared in 500 ml of deoxygenated water. N-1-octylacrylamide, $C_8AM$, was dissolved in this solution, followed by acrylamide and 3-methacrylamidopropyltrimethylammonium chloride, MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C., the viscous solution was poured slowly into 3 L of acetone. The precipitated polymer was then masticated in a Waring blender with additional acetone, filtered and dried under vacuum at 30° C. A variety of terpolymers were prepared using similar techniques with differing amounts of hydropobic octylacrylamide monomer, cationic MAPTAC monomer and micellar surfactants, as listed in Table I. The surfactants used to prepared the micellar polymerization solution were dodecyltrimethylammonium chloride, Quat, and ethoxylated nonyl phenol with 10 to 11 ethoxy grups, CO-710 supplied by GAF. The elemental analysis of these polymers is given in Table II.

These Examples demonstrate processes for preparing terpolymers containing a range of hydrophobic and cationic monomer levels.

TABLE I

Compositional Data for Acrylamide-MAPTAC Polymers

| Example No. | MAPTAC, Mole % | $C_8AM$ Mole % | Surfactant Type | Wt. % | Monomer Concentration Wt. % | Initiators $K_2S_2O_8$ [M × 10⁴] | $Na_2S_2O_5$ [M × 10⁴] |
|---|---|---|---|---|---|---|---|
| 1 | 20 | 1.0 | Quat | 3 | 4.5 | 0.81 | 0.81 |
| 2 | 20 | 0.0 | Quat | 3 | 4.5 | 0.83 | 0.83 |
| 3 | 20 | 1.0 | Quat | 3 | 6.0 | 0.81 | 0.81 |
| 4 | 20 | 1.0 | Quat | 3 | 9.0 | 0.81 | 0.81 |
| 5 | 20 | 1.0 | Quat | 4.5 | 9.0 | 0.81 | 0.81 |
| 6 | 20 | 1.0 | Quat | 6 | 12 | 0.81 | 0.81 |
| 7 | 20 | 0.0 | — | | 4.5 | 0.83 | 0.83 |
| 8 | 20 | 1.0 | Quat | 3 | 4.5 | 0.81 | 0.81 |
| 9 | 5 | 0.0 | Quat | 3 | 9.0 | 1.4 | 1.4 |
| 10 | 5 | 1.0 | Quat | 3 | 9.0 | 1.3 | 1.3 |
| 11 | 5 | 1.0 | Quat | 3 | 4.5 | 1.3 | 1.3 |
| 12 | 10 | 1.0 | Quat | 3 | 4.5 | 1.1 | 1.1 |
| 13 | 5 | 1.0 | Quat | 4.5 | 4.5 | 1.3 | 1.3 |
| 14 | 20 | 1.0 | CO-710 | 5 | 4.5 | 0.81 | 0.81 |
| 15 | 20 | 0.0 | — | | 4.5 | 0.83 | 0.83 |
| 16 | 20 | 0.0 | CO-710 | 3 | 4.5 | 0.83 | 0.83 |
| 17 | 20 | 1.0 | CO-710 | 3 | 4.5 | 0.81 | 0.81 |
| 18 | 20 | 1.5 | CO-710 | 3 | 4.5 | 0.80 | 0.80 |
| 19 | 10 | 0.0 | Quat | 3 | 4.5 | 1.1 | 1.1 |
| 20 | 10 | 2.5 | Quat | 3 | 4.5 | 1.1 | 1.1 |
| 21 | 10 | 0.0 | Quat | 3 | 4.5 | 1.1 | 1.5 |
| 22 | 10 | 1.5 | Quat | 3 | 4.5 | 1.1 | 1.1 |
| 23 | 10 | 1.0 | CO-710 | 3 | 9.0 | 1.1 | 1.1 |
| 24 | 10 | 1.0 | Quat | 3 | 9.0 | 1.1 | 1.1 |

TABLE II

Elemental Analysis of Terpolymers

| Example No. | Cl Analysis, % Calc | Found | MAPTAC INC.,[a] | Conversion |
|---|---|---|---|---|
| 1 | 6.96 | 6.39 | 104 | 87.6 |
| 2 | 7.03 | 6.20 | 97 | 96.9 |
| 3 | 6.96 | 5.87 | 92 | 100 |
| 4 | 6.96 | 5.72 | 92 | 100 |
| 5 | 6.96 | 6.52 | 103 | 89.6 |
| 6 | 6.96 | 6.80 | 108 | 82.9 |
| 7 | 7.03 | 5.35 | 84 | 22.8 |
| 8 | 6.96 | 6.33 | 100 | 84.8 |
| 9 | 2.26 | 2.02 | 96 | 99.1 |
| 10 | 2.23 | 1.74 | 85 | 94.5 |
| 11 | 2.23 | 1.96 | 97 | 100 |
| 12 | 4.08 | 3.47 | 94 | 94.7 |
| 13 | 2.23 | 2.03 | 94 | 96.0 |
| 14 | 6.96 | 6.36 | 99 | 75.6 |
| 15 | 7.03 | 5.36 | 84 | 48.4 |
| 16 | 7.03 | 5.94 | 91 | 77.8 |
| 17 | 6.96 | 6.27 | 97 | 76.3 |
| 18 | 6.92 | 6.54 | 102 | 72.1 |
| 19 | 4.13 | 3.35 | 87 | 100 |
| 20 | 4.00 | 3.61 | 97 | 100 |
| 21 | 4.13 | 3.72 | 92 | 95.3 |
| 22 | 4.05 | 3.81 | 97 | 90.4 |

TABLE II-continued

| | Elemental Analysis of Terpolymers | | | |
|---|---|---|---|---|
| Example | Cl Analysis, % | | | |
| No. | Calc | Found | MAPTAC INC.,[a] | Conversion |
| 23 | 4.08 | 3.24 | 83 | 73.8 |
| 24 | 4.08 | 3.68 | 94 | 95.8 |

[a]MAPTAC incorporation = Cl(found)/Cl(calc) × 100 corrected for polymer volatiles content.

EXAMPLES 25–27

Micellar Polymerization with Other Cationic Monomers

A micellar surfactant solution was prepared in 500 ml of deoxygenated water. N-octylacrylamide, $C_8AM$, was dissolved in this solution, followed by acrylamide and cationic monomer. The resulting solution was carefully transferred to a 1 L morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C., the viscous solution was poured slowly into 3 L of acetone. The precipitated polymer was then masticated in a Waring blender with additional acetone, filtered and dried under vacuum at 30° C. A variety of terpolymers, listed in Table III, were prepared with 2-meth acrylatoethyltrimethylammonium chloride, METAC, and diallyl dimethylammonium chloride, DMDAAC, using similar techniques. The yields and analysis of the isolated polymers are given in Table IV.

EXAMPLES 28–30

Micellar Polymerization with Other Hydrophobic Monomers

A micellar surfactant solution was prepared in 500 mol of deoxygenated water. Hydrophobic monomer was dissolved in this solution, followed by acrylamide and MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C., the viscous solution was poured slowly into 3 L of acetone. The precipitated polymer was then masticated in a Waring blender with additional acetone, filtered and dried under vacuum at 30° C. A variety of terpolymers, listed in Table V, were prepared with t-octylacrylamide, t-$C_8AM$, n-dodecylacrylamide, $C_{12}AM$ and dodecylmethyacrylate, $C_{12}MA$, using similar techniques. The yields and analysis of the isolated polymers are given in Table VI.

TABLE III

| | Additional Cationic Terpolymers | | | | | | |
|---|---|---|---|---|---|---|---|
| | Cationic | | | | Monomer | Redox Initiator | |
| Example | Monomer | $C_8AM$ | Surfactant | | Concentration | $K_2S_2O_8$ | $Na_2S_2O_5$ |
| No. | (Mole %) | Mole % | Type | Wt. % | Wt. % | [M × 10^4] | [M × 10^4] |
| 25 | METAC (10) | 1.0 | CO-710 | 3 | 9.0 | 0.81 | 0.81 |
| 26 | DMDAAC (20) | 1.0 | CO-710 | 5 | 4.5 | 0.81 | 0.81 |
| 27 | DMDAAC (20) | 1.0 | Quat | 3 | 4.5 | 0.81 | 0.81 |

TABLE IV

| | Elemental Analysis of Terpolymers | | | |
|---|---|---|---|---|
| | | | Cationic | |
| Example | Cl Analysis, % | | Monomer Inc.[a] | Conversion |
| No. | Calc. | Found | % | % |
| 25 | 4.14 | 2.85 | 69 | 80.0 |
| 26 | 7.87 | 1.75 | 22 | 61.3 |
| 27 | 7.87 | 2.10 | 27 | 67.7 |

[a]Cationic monomer incorporation = Cl(found)/Cl(calc) × 100 corrected for polymer volatiles content.

EXAMPLE 31

Solution Viscometrics

Polymer solutions were prepared by the slow addition of a weighed polymer sample to rapidly stirring water in a 125 ml Erlenmeyer flask. Upon complete addition, stirring was stopped and the flask was sealed under nitrogen. Dissolution was allowed to continue for 24 hours with mild agitation. Viscosity determinations of 2,677 ppm polymer solutions were made on a Contraves[R] Low Shear Rheometer at 1.3 and 11 sec$^{-1}$ at 25° C. These techniques were used to collect the data presented in Tables VII through X.

TABLE V

| | | Terpolymers with Other Hydrophobic Monomers | | | | | |
|---|---|---|---|---|---|---|---|
| | | | | | Monomer | Redox Initiators | |
| Example | MAPTAC | Hydrophobe | | Surfactant | | Concentration | $K_2S_2O_8$ | $Na_2S_2O_5$ |
| No. | (Mole %) | Type | Mole % | Type | Wt. % | Wt. % | [M × 10^4] | [M × 10^4] |
| 28 | 20 | t-$C_8AM$ | 1.0 | CO-710 | 3 | 4.5 | 0.81 | 0.81 |
| 29 | 20 | $C_{12}AM$ | 1.0 | CO-710 | 3 | 4.5 | 0.81 | 0.81 |
| 30 | 10 | $C_{12}MA$ | 1.0 | CO-710 | 5 | 9.0 | 0.81 | 0.81 |

TABLE VI

| | Elemental Analysis of Terpolymers | | | | |
|---|---|---|---|---|---|
| | | | | Cationic | |
| Example | Hydrophobe | | Cl Analysis | | Incorporation[a] | Conversion |
| No. | Type | Mole % | Calculated | Found | % | % |
| 28 | t-$C_8AM$ | 1.0 | 6.96 | 6.13 | 97 | 84.0 |
| 29 | $C_{12}AM$ | 1.0 | 6.92 | 6.30 | 103 | 79.5 |

TABLE VI-continued

| | Elemental Analysis of Terpolymers | | | | | |
|---|---|---|---|---|---|---|
| Example No. | Hydrophobe Type | Mole % | Cl Analysis Calculated | Cl Analysis Found | Cationic Incorporation[a] % | Conversion % |
| 30 | $C_{12}MA$ | 1.0 | 4.04 | 2.15 | 53 | 64.2 |

[a]Cationic monomer incorporation = Cl(found)/Cl(calc) × 100 corrected for polymer volatiles content.

EXAMPLE 32

Effect of Micellar Surfactant

As shown by the data presented in Table VII, use of the nonionic surfactant, CO-710, resulted in polymers with higher solution viscosity as compared to the cationic surfactant, dodecyltrimethylammonium chloride, Quat, under conditions tested. Also in Table VII, the data show that the concentration of surfactant had a significant effect on polymer solution viscosification. With dodecyltrimethylammonium chloride as the surfactant the viscosity decreased from 12 cP at 1.3 and 11 sec$^{-1}$ to 9.4 and 9.5 cP, respectively, when the surfactant concentration was increased from 3 to 4.5 weight percent (Example II versus 14). However, using CO-710 the viscosity loss was more pronounced dropping from 640 and 242 cP, down to 238 and 136 cP at the same shear rates when the surfactant concentration was increased from 3 to 5 weight percent (Examples 18 versus 15). This illustrates the criticality of surfactant type and concentration in controlling solution properties.

TABLE VII

| | Effect of Micellar Surfactant | | | |
|---|---|---|---|---|
| Example No. | MAPTAC Mole % | Surfactant (Wt. %) | Viscosity, cP, @ 2677 ppm 1.3 sec$^{-1}$ | 11 sec$^{-1}$ |
| 8 | 20 | Quat (3) | 38 | 35 |
| 24 | 10 | Quat (3) | 84 | 67 |
| 11 | 5 | Quat (3) | 12 | 12 |
| 13 | 5 | Quat (4.5) | 9.4 | 9.5 |
| 17 | 20 | CO-170 (3) | 640 | 242 |
| 14 | 20 | CO-170 (5) | 238 | 136 |
| 23 | 10 | CO-170 (3) | 2276 | — |

EXAMPLE 33

Effect of Monomer Concentraton

As shown in Table VIII, the solution viscosity increased at all compositions when the monomer concentration in the polymerization reactor was increased. This was evident at all levels of MAPTAC and with either surfactant type. Although no molecular weight determinations were made on these polymers, it can be speculated that the observed increase in viscosity with monomer concentration was due to increased molecular weight.

TABLE VIII

| | Effect of Monomer Concentration | | | |
|---|---|---|---|---|
| Example No. | MAPTAC Mole % | Monomer (Wt. %) | Viscosity, cP @ 2677 ppm 1.3 sec$^{-1}$ | 11 sec$^{-1}$ |
| 11 | 5 | 4.5 | 12 | 12 |
| 10 | 5 | 9.0 | 48 | 26 |
| 12 | 10 | 4.5 | 28 | 25 |
| 24 | 10 | 9.0 | 84 | 67 |

EXAMPLE 34

Effect of Hydrophobic Monomer Concentration

The effect of hydrophobic monomer content in the cationic polymer is shown in Table IX. For terpolymers containing 10 mole percent MAPTAC, it can be seen that as the level of $C_8AM$ increases the solution viscosity increases. This is believed to be due to intermolecular polymer associatd. Similar results were obtained for a series of terpolymers containing 20 mole percent MAPTAC and a similar range of $C_8AM$. Again, both series of polymers show a direct relationship between solution viscosity and hydrophobe level.

TABLE IX

| | Effect of Hydrophobic Monomer Level | | |
|---|---|---|---|
| Example No. | $C_8AM$ Mole % | Solution Viscosity, cP @ 2677 ppm 1.3 sec$^{-1}$ | 11 sec$^{-1}$ |
| 21 | 0.0 | 15 | 15 |
| 12 | 1.0 | 28 | 25 |
| 22 | 1.5 | 105 | 63 |
| 16 | 0.0 | 236 | 140 |
| 17 | 1.0 | 640 | 242 |
| 18 | 1.5 | 2466 | — |

EXAMPLE 35

Effect of Hydrophobe Chain Length

The effect of hydrophobe alkyl chain length on the solution viscosity of 20 mole percent MAPTAC terpolymers containing 1 mole percent hydrophobe wherein the alkyl functionality of the hydrophobe includes t-octyl, n-octyl, and n-dodecyl is shown in Table X. As the effective chain length increases from four carbon atoms of the t-octyl to twelve for n-dodecyl group, the solution viscosity of the terpolymers is increased. The effect of this variable can best be interpreted as due to increased hydrodynamic volume from increased intermolecular hydrophobic association of polymer chains as a result of the presence of a more effective hydrophobe, i.e., $C_4$ versus $C_8$ versus $C_{12}$ chain lengths.

TABLE X

| | Effect of Hydrophobic Monomer Type | | |
|---|---|---|---|
| Example No. | Hydrophobe Type | Solution Viscosity, cP @ 2670 ppm 1.3 sec$^{-1}$ | 11 sec$^{-1}$ |
| 28 | $t-C_8AM$ | 175 | 111 |
| 17 | $C_8AM$ | 640 | 242 |
| 29 | $C_{12}AM$ | 843 | 299 |

EXAMPLE 36

Synthetic Emulsion I Preparation

Cody crude oil (10 g), with the free water removed, was emulsified into 495 g of distilled water containing 100 ppm of an anionic surfactant using a Waring blender or a homogenizer. The concentrated emulsion was permitted to sit overnight (approximately 18 hours) in a separatory funnel and then the bottom layer was diluted (25 g of emulsion per liter of distilled water) and salinity adjusted to 600 ppm of NaCl. This resulted in a test emulsion with the following typical properties:

| Turbidity: | 270 to 280 NTU |
| Oil Content: | 420 to 450 mg/l |
| pH: | 8.0 (adjusted) |

Usually a large volume of this emulsion (15 L) was prepared and any unused portion was discarded at the end of the day. The emulsion concentrate was occasionally prepared several days ahead of time and removed from the separatory funnel after the prescribed aging time.

EXAMPLE 37

Oily Water Jar Test

The test emulsion prepared in Example 36 is separated into 500 ml samples, as needed, in 600 ml clear glass beakers (six at a time) and placed on a six-paddle Phipps & Bird stirrer and mixed at approximately 150 to 160 rpm. Polymer is added at this mixing speed and timing is begun. After 30 minutes at high speed the mixing rate is reduced to 10 rpm for 15 minutes and then the beakers are removed from the mixer and allowed to stand for 60 minutes. Samples of solution are removed from a point near the 250 ml mark on the beakers and tested for turbidity (NTU) and oil-in-water content. The object of the test is to achieve the lowest NTU or oil level using the smallest amount of polymer.

EXAMPLE 38

Oily Water Jar Test

Two polymers made by the process of Examples 1–24 were tested. One polymer, Example 10, was made with 5% cationic MAPTAC monomer, 1% C$_8$AM hydrophobe, the remainder being acrylamide, while the other, Example 9, was made under identical conditions but with no hydrophobic monomer added. Example 9 is similar to commercial polymers. A typical set of test results which demonstrates the benefits of hydrophobic functionalization of water soluble polymers taught in this patent using a laboratory simulated waste water emulsion jar test are shown below.

| ppm Oil Remaining After Treatment with Polymer (starting oil = 505 ppm) | | |
|---|---|---|
| ppm Polymer | Example 10 | Example 9 |
| 1.0 | 461 | 483 |
| 2.0 | 459 | 455 |
| 3.0 | 152 | 417 |
| 3.5 | 95 | |
| 4.0 | 25 | 28 |
| 4.5 | 13 | |
| 5.0 | 5.6 | 20 |
| 5.5 | 4.6 | |
| 6.0 | 6.1 | 36 |
| 7.0 | 9.3 | 60 |

What is claimed is:

1. A homogeneous micellar free radical polymerization process for the formation of a terpolymer of acrylamide, a hydrophobic monomer, and a cationic monomer wherein said terpolymer is selected from the group consisting of

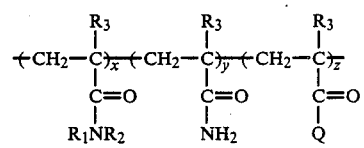

wherein $R_1$ is a $C_6$ to $C_{30}$ linear or branched alkyl, alkylcycloalkyl, or alkylaryl group; $R_2$ is the same type of group as $R_1$; Q is $NH(CH_2nN^+(R_{4,5,6})_3X^-$ or $O(CH_2)nN^+(R_{4,5,6})_3X^-$ wherein n=1 to 6 and $R_4$, $R_5$ and $R_6$ are hydrogen, a $C_1$ to $C_6$ linear or branched group, or a $C_5$ to $C_8$ cycloalkyl, aromatic, or alkylaromatic group; and $X^-$ is an anion selected from the group consisting of chloride, bromide or methyl or hydrogen sulfate; and wherein x equals 0.1 to 20 mole percent, y is 10 to 94.9 mole percent, and z is 5 to 99.9 mole percent,

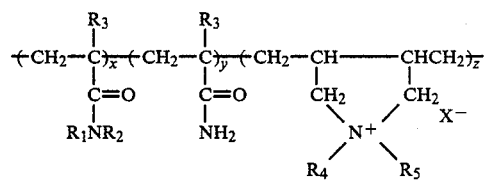

wherein $R_1$ is a $C_6$ to $C_{30}$ linear or branched alkyl, alkylcycloalkyl, or alkylaryl group; $R_2$ is the same type of group as $R_1$ or hydrogen or $C_1$ to $C_3$ linear or branched alkyl group; $R_3$ is hydrogen or methyl; $R_4$ and $R_5$ are hydrogen, a $C_1$ to $C_6$ linear or branched group, or a $C_5$ to $C_8$ cycloalkyl aromatic, or alkylaromatic group; $X^-$ is an anion selected from the group consisting of chloride, bromide or methyl sulfate; and wherein x equals 0.1 to 20 mole percent; y is 10 to 94.9 mole percent; and z is 5 to 99.9 mole percent,

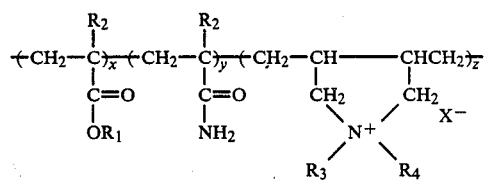

wherein $R_1$ is a $C_4$ to $C_{30}$ linear or branched alkyl, alkylcycloalkyl, or alkylaryl group; $R_2$ is hydrogen or methyl; $R_3$ and $R_4$ are hydrogen, a $C_1$ to $C_6$ linear or branched group, or a $C_5$ to $C_8$ cycloalkyl aromatic or alkyalaromatic group; $X^-$ is an anion selected from the group consisting of chloride, bromide or methyl sulfate; and wherein x equals 0.1 to 20 mole percent; y is 10 to 94.9 mole percent; and z is 5 to 99.9 mole percent,

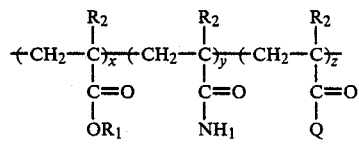

wherein $R_1$ is a $C_4$ to $C_{30}$ linear or branched alkyl, alkylcycloalkyl, or alkylaryl group; $R_2$ is hydrogen or methyl; Q is $NH(CH_2)_nN^+(R_{3,4,5})_3X'^a$ or O(CH$_2$)$_n$N$^+$(R$_{3,4,5}$) X$^-$ wherein n=1 to 6, and R$_3$, R$_4$ and R$_5$ are hydrogen, a C$_1$ to C$_6$ linear, branched group, or a C$_5$ to C$_8$ cycloalkyl, aromatic, or alkylaromatic group, and X$^-$ is an anion selected from the group consisting of chloride, bromide, or methyl or hydrogen sulfate; and wherein x is 0.1 to 20 mole percent, y is 10 to 94.9 mole percent; and z is 5 to 99.9 mole percent, and a cationic monomer which comprises the steps of:
  a. forming a homogeneous solution in deoxygenated water of acrylamide, a hydrophobic monomer and a cationic monomer using a suitable cationic or nonionic surfactant or a mixture of both types of surfactants under a deoxygenated atmosphere;
  b. adding free radical initiator to said homogeneous reaction mixture to initiate polymerization of said monomers;
  c. copolymerizing said monomer mixture at a temperature of above 10° C. to 90° C. for a sufficient period of time to form said terpolymer without the formation of substantial amounts of particulates or phase separation occurring.

2. A process according to claim 1 wherein said terpolymer is water soluble.

3. A process according to claim 1 or 2 wherein the total monomer concentration in the polymerization medium is 3 to 20 weight percent.

4. A process according to claim 1 or 2 wherein said surfactant is selected from the group of cationic surfactants consisting of sodium decyltrimethylammonium chloride, sodium dodecyltrimethylammonium chloride, or tetradecyltrimethylammonium chloride.

5. A process according to claim 1 or 2 wherein said surfactant is selected from the group of water dispersable nonionic surfactants consisting of alkyl alkoxylates and alkylarene alkoxylates.

6. A process according to claim 1 or 2 wherein said surfactant is a blend of nonionic and cationic surfactants.

7. A process according to claim 1 or 2 wherein said surfactant is present at a level of 10 to 200 moles per mole of hydrophobic monomer.

8. A process according to claim 1 or 2 wherein said free radical initiator is selected from the water soluble group consisting of hydrogen peroxide and sodium, potassium or ammonium persulfate.

9. A process according to claim 1 or 2 wherein said free radical initiator is selected from water soluble redox couples consisting of an oxidant, such as sodium, potassium or ammonia persulfate or bromate, and a reductant, such as sodium metabisulfite or a tertiary amine, such as triethylamine.

10. A process according to claim 1 or 2 wherein said initiator is added at a level such that the ratio of the total monomer concentration to the square root of initiator concentration is 10 to 250 $M^{\frac{1}{2}}$.

* * * * *